May 14, 1929.　　E. H. LICHTENBERG　　1,712,832
WATER MEASURING DEVICE
Filed June 11, 1926　　2 Sheets-Sheet 1
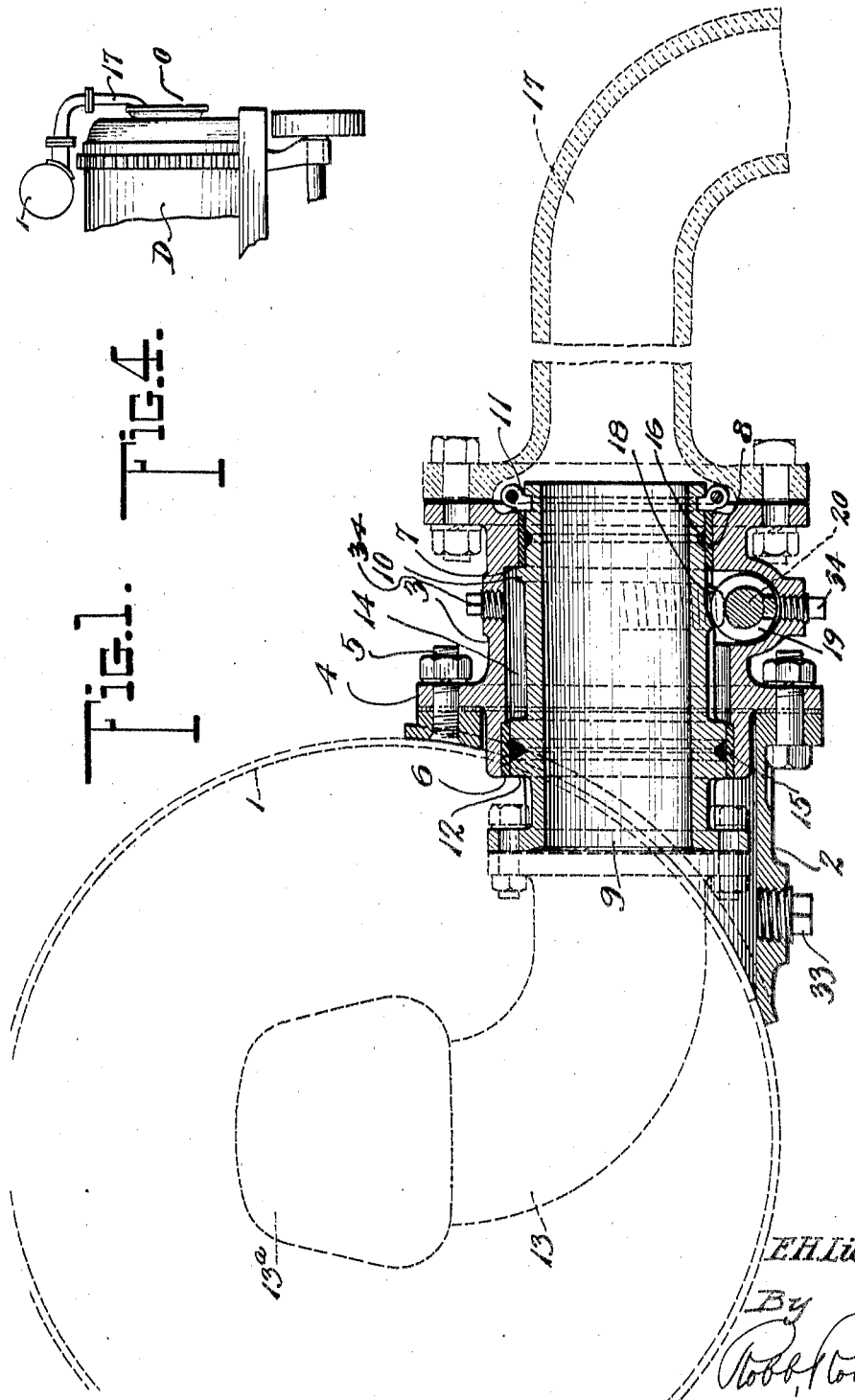

May 14, 1929.  E. H. LICHTENBERG  1,712,832
WATER MEASURING DEVICE
Filed June 11, 1926    2 Sheets-Sheet 2
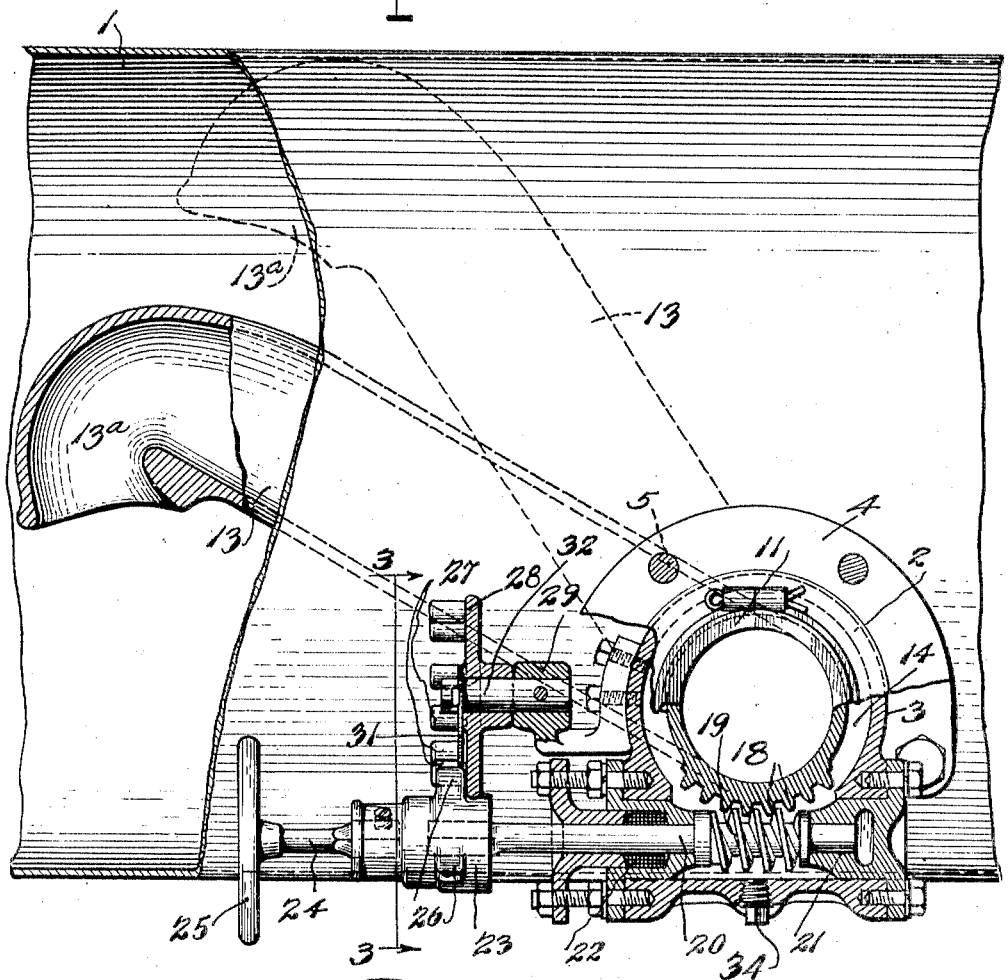
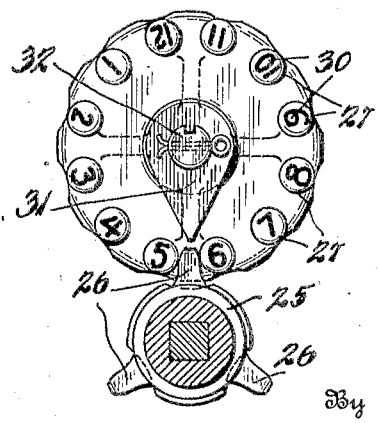
Inventor
E. H. Lichtenberg
By Ross, Robert Hill
Attorneys

Patented May 14, 1929.

1,712,832

UNITED STATES PATENT OFFICE.

ERICH H. LICHTENBERG, OF MILWAUKEE, WISCONSIN, ASSIGNOR TO KOEHRING COMPANY, OF MILWAUKEE, WISCONSIN, A CORPORATION.

WATER-MEASURING DEVICE.

Application filed June 11, 1926. Serial No. 115,310.

The present invention relates to devices for delivering accurately measured quantities of water from a tank into a concrete mixer or other receptacle into which it may be desired to discharge regulated quantities of water or some other liquid.

In a concrete mixer it is important that the full amount of the water be quickly supplied so that all of the aggregates and the full amount of water will be in place when the mixing starts. In order to accomplish this result and avoid any dribbling in the flow of water into the mixer it has been proposed to take the water from the tank through a measuring or siphon pipe which projects upwardly into the tank and terminates in a hood forming a large chamber to which the water is admitted from the under side. This measuring pipe or siphon can be set at different angles according to the particular amount of water which is to be discharged at each operation, the mouth of the chamber being set at the point where the water level of the tank will be when the full specified amount of water has been discharged into the mixer. This construction introduces a siphon action that maintains discharge at the full capacity of the siphon pipe until the full specified amount of water has been sent to the mixer. Air then enters the chamber and instantly cuts off any further discharge. The siphon action is employed to maintain a proper amount of water at the mouth of the discharge pipe for the full period that water is being discharged.

The present invention relates more particularly to a novel mounting of the measuring or siphon pipe and means associated therewith for quickly and accurately setting the siphon pipe at the proper position to obtain a discharge of the specified amount of water.

While one embodiment of the invention is shown and described for illustrative purposes it will be understood that many modifications and changes can be made in the details of construction without departing from the spirit of the invention.

For a full understanding of the invention reference is to be had to the following description and accompanying drawings, in which Figure 1 is a longitudinal sectional view through the bearing for the measuring or siphon pipe of a tank, the tank and siphon pipe therein being indicated by dotted lines.

Figure 2 is a transverse sectional view through the bearing showing the gearing for rotating the bearing sleeve, portions of the tank and the end of the siphon pipe being broken away and shown in section.

Figure 3 is a sectional view on the line 3—3 of Figure 2, looking in the direction of the arrows, showing the indicating device which enables the operator to set the siphon pipe at the proper position for obtaining a discharge of the desired quantity of water.

Figure 4 is a diagrammatic view showing the relation of the water tank and measuring device to the concrete mixer.

Corresponding and like parts are referred to in the following description and indicated on all of the views of the drawings by like reference characters.

Referring to the drawings, the numeral 1 designates a tank which may be of any suitable size and shape, and which is shown for illustrative purposes as cylindrical in shape and disposed in a horizontal position. A fitting 2 is applied to one side of the tank at a point toward the bottom, thereof, and one end of a housing 3 projects into the fitting, said housing being formed upon the exterior thereof with an annular flange 4 which is secured to the fitting 2 in some suitable manner as by means of the bolts 5. The inner end of the housing 3 is rabbeted to receive a bushing 6, while the rear end of the housing is formed with an annular seat 7 upon which a second bushing 8 is fitted.

A sleeve 9 is mounted within the housing, the outer end of the sleeve being received within the outer bushing 8 and formed with a flange 10 which engages the inner face of the annular seat 7 to limit outward sliding movement of the sleeve through the housing. The extreme outer end of the sleeve 9 is grooved to receive a split thrust washer 11 which engages the outer end of the housing and holds the sleeve against longitudinal sliding movement in a direction toward the tank.

At a point toward its inner end the sleeve is formed with an enlargement 12 which is journaled within the inner bushing 6. The extreme inner end of the sleeve is flanged and has the lower end of the measuring or siphon tube 13 rigidly secured thereto. The sleeve is rotatable within the bushings 6 and 8 and as the sleeve is rotated the measuring or siphon tube 13 is tilted into different positions. The swinging end of the siphon tube terminates in a hood 13ª which has the inlet opening in the bottom or under side thereof. The mouth of the chamber of the hood thus faces downwardly and is submerged in the water until after the full specified amount of water has been discharged. As previously stated, this provides for a quick discharge of the water and avoids dribbling.

A space 14 is provided between the exterior of the sleeve 9 and the housing 3 and this space is intended to be filled with grease. The annular flange or enlargement 12 at the inner end of the sleeve is preferably provided with a sealing ring 15 and, if desired, the outer end of the sleeve may be provided with a sealing ring 16 arranged to engage the outer bushing 8. The outer end of the housing 3 is flanged and has an outlet pipe 17 rigidly secured thereto.

The exterior of the sleeve 9 is provided at an intermediate point with a segmental set of teeth 18 which engage a worm 19 on a worm shaft 20. The inner end of the worm shaft 20 is journaled in a bearing 21 which is removably applied to the housing 3, and the shaft projects through a suitable stuffing box 22 which provides a tight joint and prevents the escape of the lubricant which is packed around the gear members.

The projecting end of the worm shaft is shown as terminating in a square end which is received in a correspondingly shaped recess in a hub member 23. The opposite end of the hub member is formed with a square opening receiving the end of a short shaft 24 which has a hand wheel 25 fitted thereon. The shaft 24 is in alignment with the worm shaft 20 so that the gearing can be operated by the hand wheel 25 to shift the siphon pipe 13 into different angular positions. The hub member 23 is provided at suitable intervals with teeth 26 which are adapted to engage projections 27 on an indicator wheel 28 which is mounted on a bracket 29 projecting from one side of the housing 3. The projections 27 have numbers 30 thereon and these numbers cooperate with a pointer 31 to indicate the quantity of water which will be discharged. The operator can thus set the device so that it will accurately discharge the desired amount of water and the parts will remain in the adjusted position until a further adjustment is wanted. The pointer 31 may be keyed on the outer end of the stub shaft 32 on which the indicator wheel is journaled. The bottom of the fitting 2 is formed with a drain opening which is normally closed by a plug 33, and the housing 3 is provided at the top and bottom thereof with grease openings which are normally closed by the plugs 34.

As is shown diagrammatically by Figure 4, the tank 1 is adapted to be mounted in an elevated position above the mixing drum or other corresponding device into which the measured quantities of water are to be discharged at periodic intervals. One end of a conventional concrete mixing drum D is shown by Figure 4, the drum being of that type which is mounted to revolve about a horizontal axis and having an opening O in one end thereof. The lower end of the outlet or discharge pipe 17 is curved to project through the opening O in the end of the drum, and owing to the elevation of the tank above the drum it will be obvious that the water which passes through the measuring mechanism will readily flow by gravity through the pipe 17 into the drum.

The tank is, of course, completely filled with water prior to each discharge operation, the filling of the tank being accomplished in any desired manner. The amount of water which will be discharged is determined by the position of the measuring or siphon tube 13 in the tank and, for reasons which have been previously stated, the discharge will take place quickly so that the full amount of water will be discharged without dribbling. The present mounting enables the siphon tube to be accurately set in the desired position and the adjustment can be changed as often as desired.

Having thus described my invention what I claim as new and desire to secure by Letters Patent is:

1. A device for discharging measured quantities of liquid from a tank, including a measuring tube projecting into the tank, a sleeve carrying the measuring tube, a bearing for the sleeve, gear teeth on the sleeve, a worm meshing with the gear teeth, and means for turning the worm to rotate the sleeve and adjust the position of the measuring tube.

2. A device for discharging measured quantities of liquid from a tank including a measuring tube projecting into the tank, a sleeve carrying the measuring tube, a housing receiving the sleeve, a bearing in the housing within which the sleeve is rotatably mounted, means for holding the sleeve against longitudinal movement, and gearing connected with the sleeve for rotating the same to adjust the position of the measuring tube.

3. A device for discharging measured quantities of liquid from a tank, including a measuring tube projecting into the tank, a sleeve carrying the measuring tube, a housing within which the sleeve is journaled, means for holding the sleeve against longitudinal movement within the housing, teeth projecting from the sleeve, a worm meshing with the teeth, a worm shaft mounted on the housing, and means for turning the worm shaft to rotate the sleeve and adjust the position of the measuring tube.

4. A device for discharging measured quantities of liquid from a tank including a measuring tube projecting into the tank, a sleeve carrying the measuring tube, a housing within which the sleeve is received, spaced bearings for the sleeve within the housing, the portion of the sleeve between the bearings being spaced from the housing to provide a grease chamber, teeth on the said portion of the sleeve, a gear element arranged within the grease chamber and meshing with the said teeth, and means for operating the gear member to rotate the sleeve and adjust the position of the measuring tube.

5. A device for discharging measured quantities of liquid from a tank including a measuring tube projecting into the tank, a sleeve carrying the measuring tube, a housing receiving the sleeve, an annular seat within the housing, a bushing on the annular seat within which the sleeve is journaled, a flange on the sleeve engaging one side of the annular seat, a removable stop member on the sleeve which engages the other side of the annular seat and cooperates with the flange to hold the sleeve against longitudinal movement, and gearing connected with the sleeve for rotating the same to adjust the position of the measuring tube.

6. A device for discharging measured quantities of liquid from a tank including a measuring tube projecting into the tank, a sleeve carrying the measuring tube, a housing receiving the sleeve, spaced annular bushings arranged within the housing and within which the sleeve is journaled, one of the bushings being smaller than the other bushing and the sleeve having an enlargement which receives the larger bushing, the portion of the sleeve between the bushings being spaced from the housing to provide a grease chamber, gear teeth projecting from the said portion of the sleeve, and a gear element engaging the teeth for cooperation therewith to rotate the sleeve and adjust the position of the measuring tube.

7. A device for discharging measured quantities of liquid from a tank, including a measuring tube projecting into the tank, a sleeve carrying the measuring tube, a housing receiving the sleeve, spaced bearings in the housing within which the sleeve is journaled, the portion of the sleeve between the bearings being spaced from the housing to provide a grease chamber, a segmental series of teeth projecting from the said portion of the sleeve, a worm engaging the said teeth, a worm shaft extending through the housing, means for turning the worm shaft to rotate the sleeve and adjust the position of the measuring tube, and means associated with the shaft for indicating the position of the measuring tube.

8. A device for discharging measured quantities of liquid from a tank, including a measuring tube projecting into the tank, a sleeve carrying the measuring tube, a housing through which the sleeve projects, a bushing in the housing within which the sleeve is journaled, a sealing ring applied to the sleeve and engaging the bushing, and means for rotating the sleeve to adjust the position of the measuring tube.

9. A device for discharging measured quantities of liquid from a tank, including a measuring tube projecting into the tank, a sleeve carrying the measuring tube, a housing receiving the sleeve and having an annular seat on the interior thereof, a comparatively small bushing on the annular seat and within which the tube is journaled, a larger bushing carried by the housing in a spaced relation to the first mentioned bushing, an enlargement on the sleeve which is journaled within the larger bushing, means on the sleeve for cooperation with the annular seat to hold the sleeve against longitudinal movement within the housing, and means for rotating the sleeve to adjust the position of the measuring tube.

10. A device for discharging measured quantities of liquid from a tank, including a measuring tube projecting into the tank, a sleeve carrying the measuring tube and in communication therewith, a housing receiving the sleeve, a discharge pipe connected to one end of the housing, bearings in the housing within which the sleeve is journaled, and means for rotating the sleeve to adjust the position of the measuring tube.

11. A device for discharging measured quantities of liquid from a tank, including a measuring tube projecting into the tank, a sleeve carrying the measuring tube and in communication therewith, a tubular housing through which the sleeve projects, a discharge pipe connected to the outer end of the housing, a liquid tight bearing in the housing within which the sleeve is journaled, and means for rotating the sleeve to adjust the position of the measuring tube.

12. A device for discharging measured quantities of liquid from a tank, including a measuring tube projecting into the tank, a sleeve carrying the measuring tube and in communication therewith, a tubular housing receiving the tube and having the inner end thereof in contact with the liquid within the tank, a discharge pipe connected to the outer end of the housing, spaced bearings within the housing for the sleeve, the portion of the sleeve between the bearings being spaced from the housing to provide a grease chamber, teeth on the said portion of the sleeve, a gear element mounted in the grease chamber and engaging the teeth, and means for operating the gear member to rotate the sleeve and adjust the position of the measuring tube.

13. In a device of the character described, the combination with an elongated tank, of a siphon within the tank, a sleeve extending through the wall of the tank and carrying the siphon, a bearing within which the sleeve is journaled, said bearing being detachably mounted upon the tank to extend laterally thereof and arranged at substantially right angles to the longitudinal axis thereof, and a discharge pipe in communication with the sleeve.

14. A device of the character described, including a tank having curved walls, a fitting fashioned at one end to engage the curved wall of the tank and having an attaching flange at the opposite end thereof, a housing fastened to the attaching flange, a sleeve journaled within the housing and peripherally geared, a worm actuator therefor, a measuring siphon arranged within the tank and carried by the sleeve, and a discharge pipe in communication with the sleeve.

In testimony whereof I affix my signature.

ERICH H. LICHTENBERG.